(12) United States Patent
Kim et al.

(10) Patent No.: US 7,345,981 B2
(45) Date of Patent: Mar. 18, 2008

(54) OPTICAL PICKUP

(75) Inventors: Tae-kyung Kim, Seoul (KR);
Young-man Ahn, Suwon-si (KR);
Chong-sam Chung, Hwaseong-si (KR);
Seok-jung Kim, Suwon-si (KR);
Tae-youn Heor, Suwon-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 591 days.

(21) Appl. No.: 11/035,042

(22) Filed: Jan. 14, 2005

(65) Prior Publication Data
US 2005/0161579 A1 Jul. 28, 2005

(30) Foreign Application Priority Data
Jan. 14, 2004 (KR) .................. 10-2004-0002749

(51) Int. Cl.
*G11B 7/00* (2006.01)

(52) U.S. Cl. .............................. 369/112.03; 369/112.1; 369/112.02; 369/112.15; 369/112.27; 369/44.24

(58) Field of Classification Search .................... None
See application file for complete search history.

(56) References Cited

U.S. PATENT DOCUMENTS

2002/0167886 A1* 11/2002 Higashino ............... 369/112.17
2004/0022152 A1*  2/2004 Hayashi .................... 369/53.2

* cited by examiner

Primary Examiner—Muhammad N. Edun
(74) Attorney, Agent, or Firm—Stein, McEwen & Bui, LLP

(57) ABSTRACT

An optical pickup including an optical member which inhibits interference light reflected from an adjacent layer from being received by a photodetector when an optical information storage medium includes a plurality of recording layers on at least one side thereof. The optical pickup suppresses a photodetector, especially first and second subphotodetectors of the photodetector, from receiving the interference light reflected from the adjacent layer.

51 Claims, 10 Drawing Sheets

OPTICAL PICKUP

CROSS-REFERENCE TO RELATED APPLICATIONS

This application claims the priority of Korean Patent Application No. 2004-2749, filed on Jan. 14, 2004, in the Korean Intellectual Property Office, the disclosure of which is incorporated herein in its entirety by reference.

BACKGROUND OF THE INVENTION

1. Field of the Invention

The present invention relates to an optical recording and/or reproduction device, and more particularly, to an optical pickup to prevent deterioration of a tracking error signal caused by an adjacent layer during recording and/or reproduction of data onto/from a multi-layer recording medium that has a plurality of recording layers on one side.

2. Description of the Related Art

In an optical recording and/or reproducing apparatus which records information on and/or reproduces information from an optical information storage medium, such as an optical disc, by using laser light focused into a light spot by an objective lens, a recording capacity is determined by a size of the light spot. A size S of the light spot is determined by a wavelength $\lambda$ of laser light and a numerical aperture (NA) of the objective lens, as shown in Equation 1:

$$S \propto \lambda/NA \quad (1)$$

Accordingly, in order to reduce the size of the light spot focused on the optical disc to increase recording density, a short wavelength light source such as a blue laser and an objective lens with an NA of more than 0.6 are required.

Since the emergence of a compact disc (CD) to record and/or reproduce information using light with a wavelength of 780 nm and an objective lens with an NA of 0.45 or 0.5, much research has gone into increasing information storage capacity by increasing recording density. The result of that research is a digital versatile disc (DVD) that can record and/or reproduce information using light with a wavelength of 650 nm, and an objective lens with an NA of 0.6 or 0.65.

At present, there is ongoing research into a high-density optical disc with over 20 GB of recording capacity using a blue wavelength light, e.g., light with a wavelength of 405 nm. The high-density optical disc is currently in the process of standardization, some of which is almost finalized. The standards specify use of light with a blue wavelength, for example, a wavelength of 405 nm, and an objective lens with an NA of 0.65 or 0.85, which will be described later on.

While the standard thickness of a CD is 1.2 mm, the standard thickness for a DVD is only 0.6 mm. The reason for the reduced thickness of DVDs is to ensure a tilt tolerance since the NA of the objective lens is increased from 0.45 for CDs to 0.6 for DVDs.

In other words, when $\theta$ denotes a tilt angle of an optical disc, n denotes a refractive index of the optical disc, d denotes the thickness of the optical disc, and NA denotes the NA of the objective lens, a coma aberration $W_{31}$ caused by tilt of the optical disc is given by Equation 2:

$$W_{31} = -\frac{d}{2} \frac{n^2(n^2-1)\sin\theta\cos\theta}{(n^2-\sin^2\theta)^{5/2}} NA^3 \quad (2)$$

wherein the refractive index n and the thickness d of the optical disk denotes a refractive index and a thickness of an optical medium ranging from a light incident surface to a recording layer, i.e., a protective layer, or a substrate.

Considering Equation 2, in order to provide a tilt tolerance, the thickness of the optical disc must be reduced when the NA of the objective lens is increased for high-density recording. Therefore, in order to provide the tilt tolerance, there is a tendency to reduce the thickness d, and so while CDs are 1.2 mm thick, DVDs are only 0.6 mm thick.

Additionally, in the case of a high-density optical disc with higher storage capacity than a DVD, if the NA of the objective lens for the high-density optical disc is increased to, for example, 0.85, the thickness of the high-density optical disc must be reduced to about 0.1 mm to prevent performance deterioration caused by tilt of the optical disc. Thus, a blu-ray disc (BD) system has an objective lens with an increased NA and a much thinner optical disc. A BD standard regulates the wavelength of a light source to 405 nm, the NA of an objective lens to 0.85, and the thickness of the optical disc to about 0.1 mm.

Another type of high-density optical disc is called an advanced optical disc (AOD). An AOD standard regulates the wavelength of a light source to 405 nm, the NA of an objective lens to 0.65, and the thickness of the optical disc to about 0.6 mm.

Here, the thickness of the optical disc is a distance between a surface where light is incident from the objective lens and an information storage surface. In the case of CDs and DVDs, the thickness refers to the thickness of the substrate. In the case of BDs, the thickness may refer to the thickness of a protective layer.

In an optical disc with a reduced thickness of 0.1 mm, one of the biggest problems is reducing a thickness deviation across the disc to less than ±3 µm. This may be inferred from Equation 3 below which expresses spherical aberration $W_{40}$ in terms of a thickness error $\Delta d$ of the optical disc that causes the spherical aberration:

$$W_{40d} = \frac{n^2-1}{8n^3}(NA)^4 \Delta d \quad (3)$$

wherein, n denotes the refractive index of a material of the disc from a light incident surface to an information storage surface, and NA denotes numerical aperture.

FIG. 1 is a graph showing a relationship between a thickness error of an optical disc and a wavefront aberration when using a light of a wavelength $\lambda=400$ nm and an objective lens with NA=0.85. As shown in FIG. 1, when the thickness error is over ±3 µm, spherical aberration produces a wavefront aberration (OPD ($\lambda$)) over 0.03$\lambda$. Thus, in a system that uses a high NA such as 0.85, detection and/or compensation of spherical aberration is indispensable.

Meanwhile, a standard DVD dual-layer disc that records information on two layers to increase storage capacity has a distance of about 55 µmm between the two layers. In order to further increase the storage capacity of the high-density optical disc, the high-density optical disc is expected to be similarly formed with a structure having a plurality of recording layers. Here, the distance between the layers is roughly determined in direct proportion to a depth of a focus.

Since the depth of the focus is directly proportional to the relation $\lambda/NA^2$ and the distance between the two layers of the DVD dual-layer disc is about 55 µm, the distance between two layers when forming a dual-layer BD may be, for example, about 17 μm. Here, a multi-layer optical disc with two or more recording layers on one side of the optical disc has a much larger recording capacity than an optical disc with a single recording layer.

Optical discs may be divided into single layer optical discs with a single recording layer on one side, and multi-layer optical discs with a plurality of recording layers on one side, according to the number of recording layers on one side. In addition, optical discs may be divided into a structure with a recording layer on only one side of the optical disc and another structure with a recording layer on both sides of the optical disc.

An optical disc with two recording layers on one side is called a dual-layer optical disc. Dual-layer optical discs may be further classified into dual-layer optical discs with a single-sided structure and dual-layer optical discs with a double-sided structure.

A differential push-pull (DPP) method to compensate for a push-pull offset produced when reproducing data from an eccentric optical disc is usually adopted for a tracking method of a recordable optical disk. Using a grating, light is diffracted into three beams. A ratio of diffracted light of negative 1st-order:0th-order:positive 1st-order is more than 1:10:1. That is, making the amount of 0th-order diffracted light large in order to increase light-use efficiency is advantageous.

FIG. 2 is a diagram of a structure of a photodetector 1 to detect a tracking error signal using the DPP method. 0th-order light is received at light receiving regions A through D, and positive and negative 1st-order light are received at light receiving regions E through H. If a phase of the positive and negative 1st-order light is shifted by 180 degrees with respect to the 0th-order light, a tracking error signal $TES_{DPP}=[(A+D)-(B+C)-\kappa[(E-F)+(G-H)]$ that is detected using the DPP method is derived, and an offset of the tracking error signal caused by movement of the objective lens is compensated for. Here, κ is 10/(1+1)=5 when the light ratio of the negative 1st-order beam, the 0th-order beam and the positive 1st-order beam is 1:10:1.

In the case of the dual-layer optical disc, L1 is assumed to be a layer closer to a light incident surface and L2 is assumed to be a layer further away. During recording and/or reproduction, light entering the photodetector is affected by not only the layer that is disposed at the focal point of an objective lens but also by the adjacent layer.

The distance between the layers as regulated in the standard is decided so that information recorded on the optical disc is not affected by cross-talk between layers. Thus, in an optical pickup, cross-talk between layers should not affect a servo signal.

FIG. 3 is a diagram of an optical path during reproduction of data from a dual-layer optical disc. Referring to FIG. 3, when reproducing from a layer L1 closer to the light incident surface, the focus of light L12 reflected from a layer L2 is located in front of the focus of light L11 reflected from the layer L1 and received by a photodetector 1. On the other hand, when reproducing from the layer L2, the focus of light L21 reflected from the layer L1 is located behind the focus of the light L22 reflected from the layer L2 and received by the photodetector 1.

FIG. 4A is a view of a distribution of light collected at the photodetector 1 when reproducing from the layer L1. FIG. 4B is a view of a distribution of light collected at the photodetector 1 when reproducing from the layer L2. In FIG. 4A, L11_0th-order light, L11_positive and negative 1st-order light, and L12_0th-order light denotes 0th-order light reflected from the layer L1, positive and negative 1st-order light reflected from the layer L1, and 0th-order light reflected from the layer L2, respectively, when reproducing from the layer L1. In FIG. 4B, L22_0th-order light, L22_positive and negative 1st-order light, and L21_0th-order light denotes 0th-order light reflected from the layer L2, positive and negative 1st-order light reflected from the layer L2, and 0th-order light reflected from the layer L1, respectively, when reproducing from the layer L2.

If the amount of 0th-order light L12 and L21 is presumed to be substantially similar as the amount of 0th-order light L11 and L22, the amount of the 0th-order light L12 and L21 corresponds to ten times the amount of 1st-order light L11 and L22. Although the amounts of the 0th-order light L12 and L21 would not actually be the same as the amounts of the 0th-order light L11 and L22, respectively, the 0th-order light may affect the 1st-order light L11 and L22. Therefore, even if the 0th-order light L12 and L21 is defocused, the 0th-order light has an effect on a tracking signal. Particularly, if the 0th-order light L12 and L21 is varied by changes in, for example, the distance between the layers, the tracking signals fluctuate.

FIG. 5 is a view illustrating the measurement signals of a difference signal (E−F) of a detection signal at the light receiving regions E and F, a difference signal (G−H) of a detection signal at the light receiving regions G and H, and a summing signal of the difference signals [(E−F)+(G−H)] when reproducing from the layer L1. As shown in FIG. 5, the fluctuations of the difference signal (E−F) and the difference signal (G−H) have opposite phases overall. Even so, when the difference signals (E−F) and (G−H) are summed, the fluctuations are not compensated for but remain.

Therefore, considering that the tracking error signal detected using the DPP method is $TES_{DPP}=[(A+D)-(B+C)-\kappa[(E-F)+(G-H)]$, the tracking error signal detected using the DPP method fluctuates by, for example, the changes in the distance between the layers.

SUMMARY OF THE INVENTION

The present invention provides an optical pickup that improves deterioration of a tracking error signal caused by an adjacent layer by suppressing inference light reflected from the adjacent layer.

According to an aspect of the present invention, there is provided an optical pickup for use with an optical information storage medium, comprising a light source which emits light of a predetermined wavelength, an objective lens which focuses the light emitted from the light source into a spot on the optical information storage medium, an optical path changer to direct light from the light source to the objective lens and to change a propagation path of the light, a photodetector which receives the light reflected from the optical information storage medium via the optical path changer and detects an information signal and/or an error signal, and an optical member which inhibits interference light reflected from an adjacent layer from being received by the photodetector when the optical information storage medium has a plurality of recording layers on at least one side thereof.

Here, the optical member includes a diffraction region which diffracts a portion of the light reflected from the adjacent layer. One of a polarization hologram or a non-polarization hologram is formed on the diffraction region. The optical member is disposed between the optical path changer and one of the objective lens or the photodetector.

The optical pickup may further include a quarter wave plate which alters the polarization of incident light, between the optical path changer and the objective lens, and a liquid crystal element which generates a phase difference to compensate for spherical aberration caused thickness deviation in the optical information storage medium.

The optical pickup may further include a grating which splits the light emitted from the light source into 0th-order light, positive 1st-order light, and negative 1st-order light, and transmits them to the optical information storage medium, wherein the optical pickup includes: a main photodetector that receives the 0th-order light reflected from the optical information storage medium; and first and second sub-photodetectors that receive the positive 1st-order light and the negative 1st-order light reflected from the optical information storage medium, wherein the optical member diffracts at least a portion of the 0th-order light reflected from an adjacent layer so that the first and second sub-photodetectors do not receive the 0th-order light.

Here, the main photodetector is at least bisected once in a radial direction and once in a tangential direction of the optical information storage medium; and the first and second sub-photodetectors are at least bisected once in the radial direction of the optical information storage medium, which makes detecting a tracking error signal using a differential push-pull method possible. The photodetector may further comprise an assistant photodetector that receives the 0th-order light diffracted by the optical member.

Here, the optical member includes a diffraction region that may be formed in a shape which corresponds to a shape of the main photodetector and the first and second sub-photodetectors, so that the main photodetector and the first and second sub-photodetectors do not receive the 0th-order light reflected from the adjacent layer. In addition, the diffraction region of the optical member may be formed as a single region so that the main photodetector and the first and second sub-photodetectors do not receive the 0th-order light reflected from the adjacent layer. Alternatively, the diffraction region of the optical member may be formed in a shape corresponding to the first and second sub-photodetectors to prevent the first and second sub-photodetectors from receiving the 0th-order light reflected from the adjacent layer.

The optical path changer may be a polarization-dependent optical path changer. The light source emits light of a blue wavelength and the objective lens satisfies a blu-ray disc standard, so that information may be recorded on and/or reproduced from an optical information storage medium with a plurality of recording layers on at least one side thereof, as regulated in the blu-ray disc standard.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
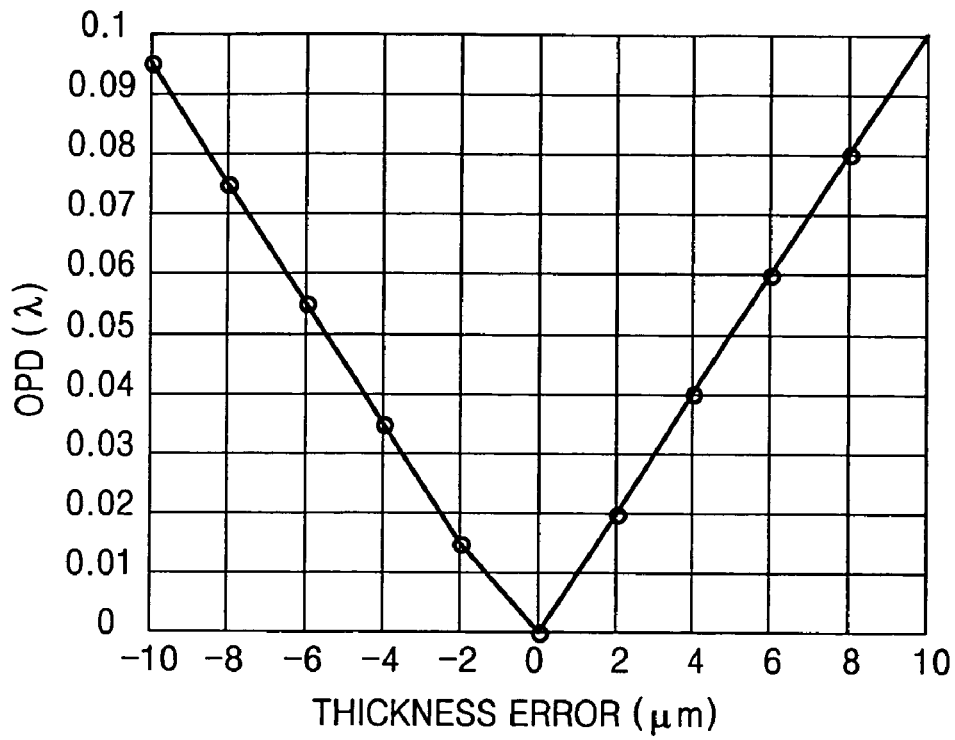
FIG. 1 is a graph showing a relationship between a thickness error of an optical disc and a wavefront aberration when using light with a wavelength $\lambda = 400$ nm and an objective lens with NA=0.85.
Figure 2:
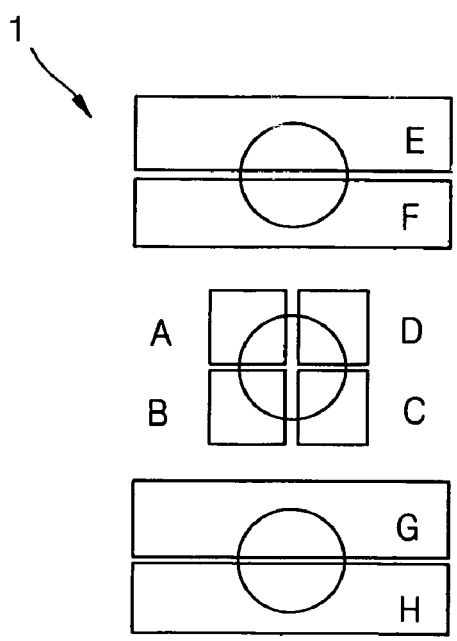
FIG. 2 is a diagram of a structure of a photodetector to detect a tracking error signal using a differential push-pull (DPP) method.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 6:
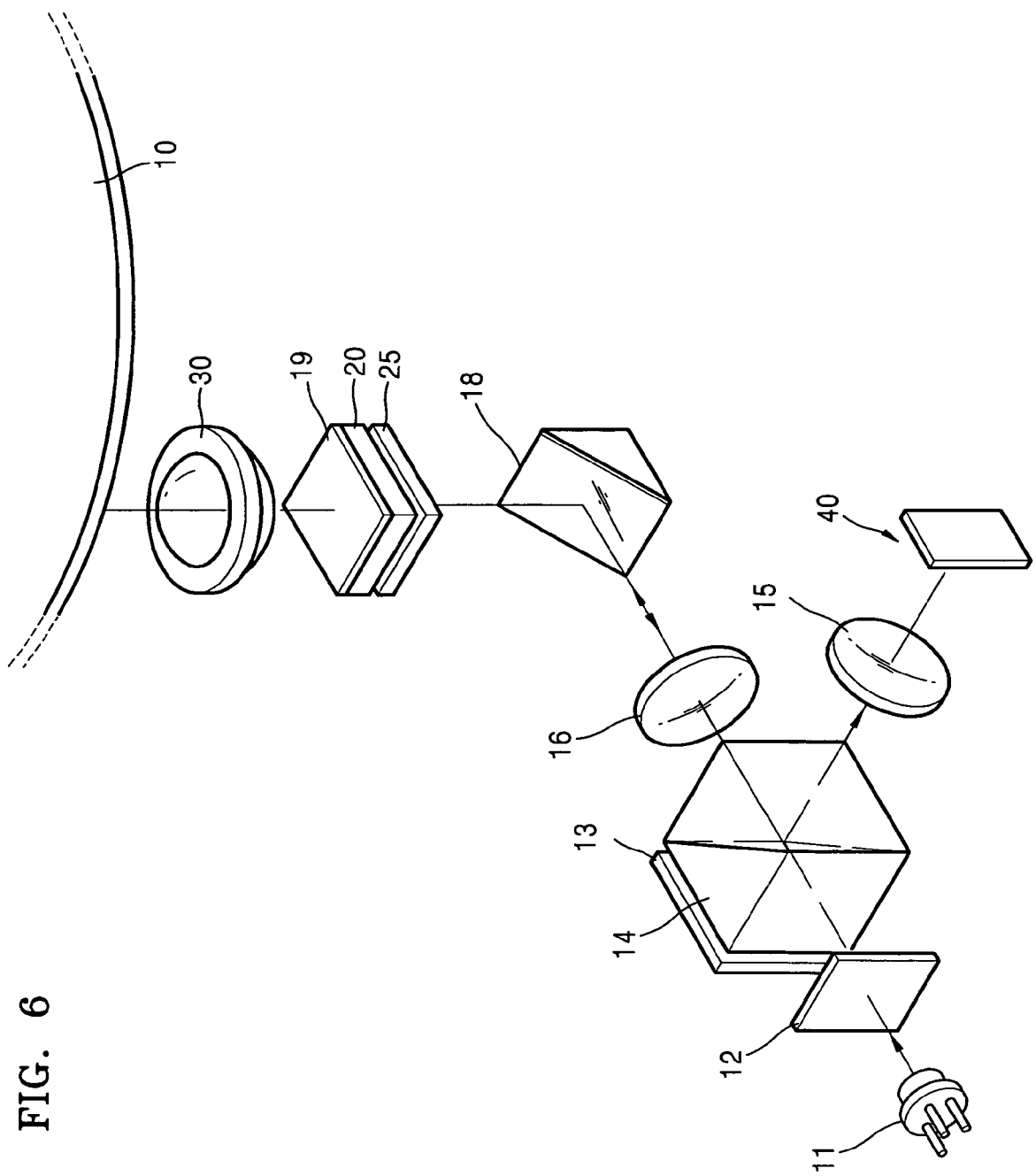
FIG. 6 is a perspective view showing an optical system of an optical pickup according to an embodiment of the present invention.
Figure 7:
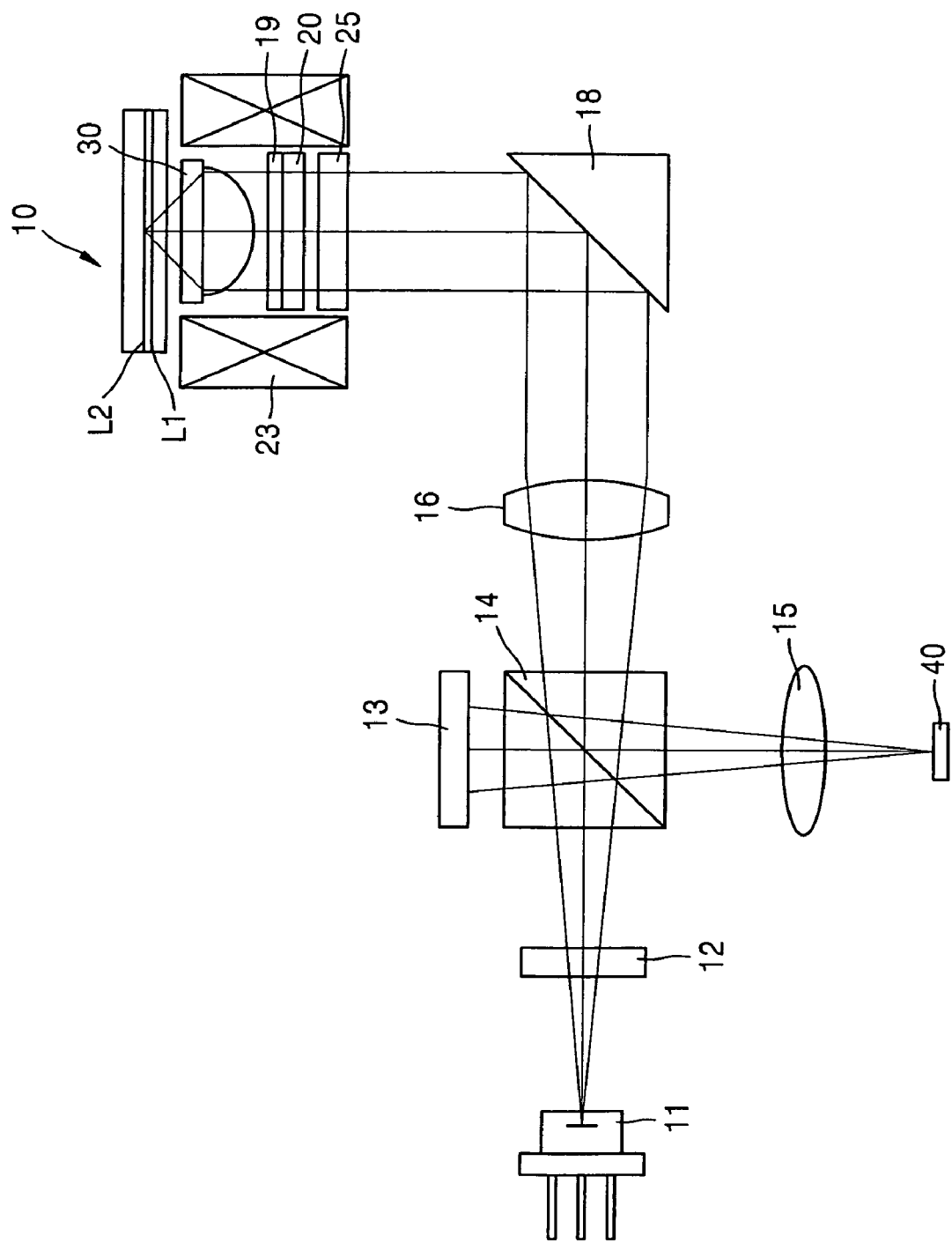
FIG. 7 is a plan view of the arrangement of the optical pickup of FIG. 6.

FIGS. 6 and 7 are views of an optical system of an optical pickup according to an embodiment of the present invention. Referring to FIGS. 6 and 7, the optical pickup includes a light source 11, an objective lens 30, an optical path changer, i.e., the polarization beam splitter 14 shown in FIG. 6, a photodetector 40, and an optical member 25. The objective lens 30 focuses light emitted from the light source 11 to be formed into a light spot on a recording medium, i.e., an optical disc 10. The optical path changer changes a propagation path of incident light. The photodetector 40 detects an information signal and/or error signal by receiving the light reflected from the optical disc 10. The optical member 25 diffracts a part of light reflected from an adjacent layer during recording on and/or reproduction from an optical disc with a plurality of layers on at least one side of the optical disc, to prevent interference caused by the light reflected from the adjacent layer when the photodetector 40 receives light.

As noted above, the optical pickup according to the present invention may include, as the optical path changer, a polarization-dependant optical path changer, e.g., a polarization beam splitter 14 to change the propagation path of incident light according to a polarization thereof, in order to satisfy a high-efficiency requirement of a recording optical system. The optical pickup may further include a quarter wave plate 19 that alters the polarization of incident light, between the polarization beam splitter 14 and the objective lens 30.

In addition, the optical pickup according to the present invention may further include a compensation element, e.g., a liquid crystal element 20 to generate a phase difference to compensate for spherical aberration caused by deviation in the thickness of the optical disc 10.

Furthermore, the optical pickup according to the present invention may further include a grating 12 to diffract light emitted from the light source 11 into 0th-order light (main light) and positive and negative 1st-order light (sub-light) so that a tracking error signal may be detected using, for example, a three-beam method or a differential push-pull method. A reproduction signal is derived from a detection signal of the 0th-order light reflected from the optical disc 10, and a tracking error signal is derived from an operation of detection signals of the 0th-order light and positive and negative 1st-order light reflected from the optical disc 10.

Reference numeral 13 denotes a front photodetector to monitor the light output power of the light source 11. Reference numeral 23 denotes an actuator to drive the objective lens 30 in a focusing, tracking, and/or tilt direction. Reference numeral 16 in FIGS. 6 and 7 denotes a collimating lens to collimate the light emitted as a divergent beam from the light source 11 into a parallel beam to allow the parallel beam to be incident on the objective lens 30, and reference numeral 15 denotes an astigmatic lens that generates astigmatic aberration so that a focus error signal may be detected using astigmatism method. In addition, reference numeral 18 denotes a reflecting mirror that bends the propagation path of the light.

The light source 11 may emit light with a predetermined wavelength. According to an aspect of the invention, that predetermined wavelength should be a blue wavelength so as to satisfy advanced optical disc (AOD) and blu-ray disc (BD) standards. As an example, light with a 405 nm wavelength suffices. In addition, the objective lens 30 may, for example, have a high numerical aperture that satisfies the BD standard, that is, a numerical aperture of about 0.85.

When the light source 11 emits the light of the blue wavelength region and the objective lens 30 has the numerical aperture of 0.85, the optical pickup according to the present invention may record on and/or reproduce from a high-density optical disc 10, especially an optical disc 10 of the BD standard.

Here, the wavelength of the light source 11 and the numerical aperture of the objective lens 30 can vary. In addition, the optical structure of the optical pickup according to the present invention may also vary. For example, the light source 11 may emit light of a red wavelength region appropriate for digital versatile discs (DVD), i.e., light with a 650 nm wavelength, and the objective lens 30 may have a numerical aperture appropriate for DVDs, i.e., a numerical aperture of 0.65. Being configured in this manner, the optical pickup of the present invention is able to record on and/or reproduce from a DVD with a plurality of recording layers on one side of the DVD.

Additionally, the optical pickup according to the present invention may include, as the light source 11, an optical module that emits, separately, light of a plurality of wavelengths so that BDs, AODs and DVDs may be compatibly adopted. For example, the light source 11 may be an optical module that emits a blue wavelength suitable for high-density optical discs and a red wavelength suitable for DVDs. Meanwhile, the optical pickup according to the present invention may include the objective lens 30 having a suitable effective numerical aperture for both BDs and DVDs, or may further include a separate member to adjust an effective numerical aperture.

Furthermore, the optical pickup according to the present invention may record on and/or reproduce from high-density optical discs using the optical structure illustrated in FIG. 6, and may further include an additional optical structure to record on and/or reproduce from DVDs and/or CDs.

Meanwhile, the polarization-dependent optical path changer, for example, the polarization beam splitter 14, directs light emitted from the light source 11 to the objective lens 30, and directs light reflected from the optical disc 10 to the photodetector 40. In FIGS. 6 and 7, the polarization-dependent optical path changer is shown as the polarization beam splitter 14 which selectively transmits or reflects incident light according to a polarization thereof. Another example of the polarization-dependent optical path changer is a polarization hologram which transmits one polarization beam emitted from the light source 11 and diffracts another polarization beam incident after reflection from the optical disc 10 into a positive or negative 1st-order beam. When the polarization-dependent optical path changer is the polarization hologram, the light source 11 and the photodetector 40 may be integrated into an optical module.

When the optical pickup includes the polarization beam splitter 14 and the quarter wave plate 19, one linearly polarized beam of light, for example, P-polarized light, incident on the polarization beam splitter 14 from the light source 11 is transmitted through the surface of the polarization beam splitter 14, is circularly polarized by the quarter wave plate 19, and then proceeds toward the optical disc 10. The one circularly polarized beam of light is converted into the other circularly polarized light when the light is reflected from the optical disc 10, and converted into another linearly polarized beam of light, for example, S-polarized light, via the quarter wave plate 19 once again. Then, the linearly polarized light is reflected from the surface of the polarization beam splitter 14 and proceeds toward the photodetector 40.

In another example, instead of the polarization-dependent optical path changer, the optical pickup may include a beam splitter which transmits and reflects incident light in a predetermined ratio, or a hologram element which transmits light emitted from the light source 11 and diffracts light reflected from the optical disc 10 into either positive or negative 1st-order light. When the optical pickup includes the hologram element as the polarization-dependent optical path changer, the light source 11 and the photodetector 40 may be integrated into an optical module.

Here, when considering the P- and S-polarized light are generally emitted from a semiconductor laser which is used as the light source 11, the optical pickup may include the quarter wave plate 19 and a non-polarization-dependent optical path changer, such as a beam splitter or a hologram element, instead of the polarization-dependent optical path changer. In this case, the optical pickup may include the quarter wave plate 19.

In the optical pickup according to the present invention, the compensation element may operate to compensate for spherical aberration caused by deviation in a distance from the light incident surface of the optical disc 10 to a target recording layer during recording/reproducing with a multiple layer optical disc 10 with a plurality of recording layers on at least one side.

The compensation element may include the liquid crystal element 20 mentioned above. Since liquid crystal has a polarization characteristic, the liquid crystal element 20, in an embodiment of the invention, selectively generates a phase difference by the polarization of incident light and the operation of an electric power source. That is, when the power is on, the liquid crystal element 20, in an embodiment of the invention, compensates for spherical aberration caused by thickness deviation by generating a phase difference in one polarized beam of light, for example, P-polarized light, which proceeds from the light source 11 to the optical disc 10, and by altering a wavefront thereof. When the power is off, the liquid crystal element 20, in an embodiment of the invention, transmits substantially all of the incident light without generating a substantial phase difference regardless of the polarization of the incident light, i.e., without altering the wavefront.

In another embodiment of the invention, the liquid crystal element 20 is disposed between the optical path changer and the quarter wave plate 19 so that the polarization of light incident on the liquid crystal element 20 from the light source 11 is substantially different from the polarization of light incident on the liquid crystal element 20 after reflection from the optical disc 10.

Figure 8:
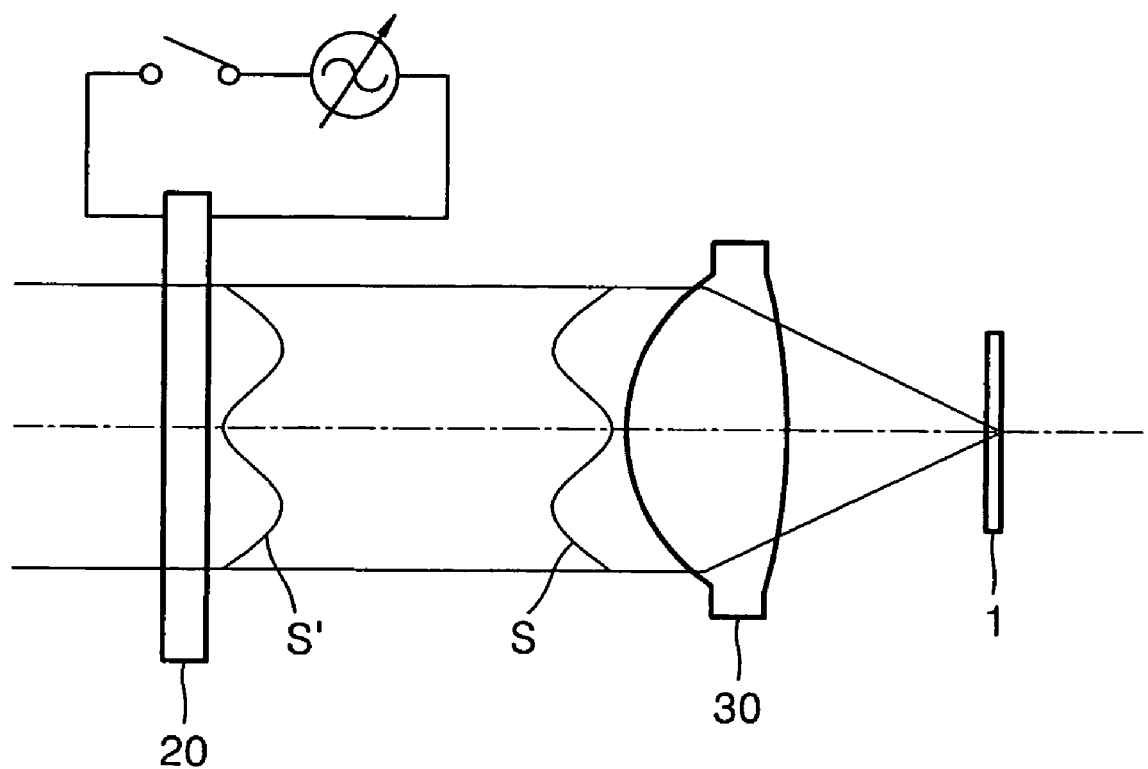
FIG. 8 is a diagram illustrating a principle of compensating for spherical aberration by using a compensation element of the optical pickup of FIG. 6.

In FIG. 8, S denotes a phase of a spherical aberration, i.e., a wavefront, generated in light focused on the recording layer of the optical disc 10 by the objective lens 30 due to a difference between the thickness of the optical disc 10 and the design value of the objective lens 30. S' denotes a phase, i.e., a wavefront, generated in the liquid crystal element 20 to compensate for the spherical aberration caused by the difference between the thickness of the optical disc 10 and the design value of the objective lens 30.

The phase distribution S and S' of FIG. 8 is a case in which the light incident on the liquid crystal element 20 is parallel light, due to the presence of a collimating lens 16 on the optical path from the light source 11 to the objective lens 30 as illustrated in FIGS. 6 and 7. The collimating lens changes divergent light emitted from the light source 11 into a parallel beam.

As shown in FIG. 8, because the spherical aberration is caused by deviation in the thickness of the optical disc 10, if the liquid crystal element 20 is driven to alter the phase distribution of transmitted light to be opposite to the phase distribution of the spherical aberration, compensating for the spherical aberration is possible.

Figure 9:
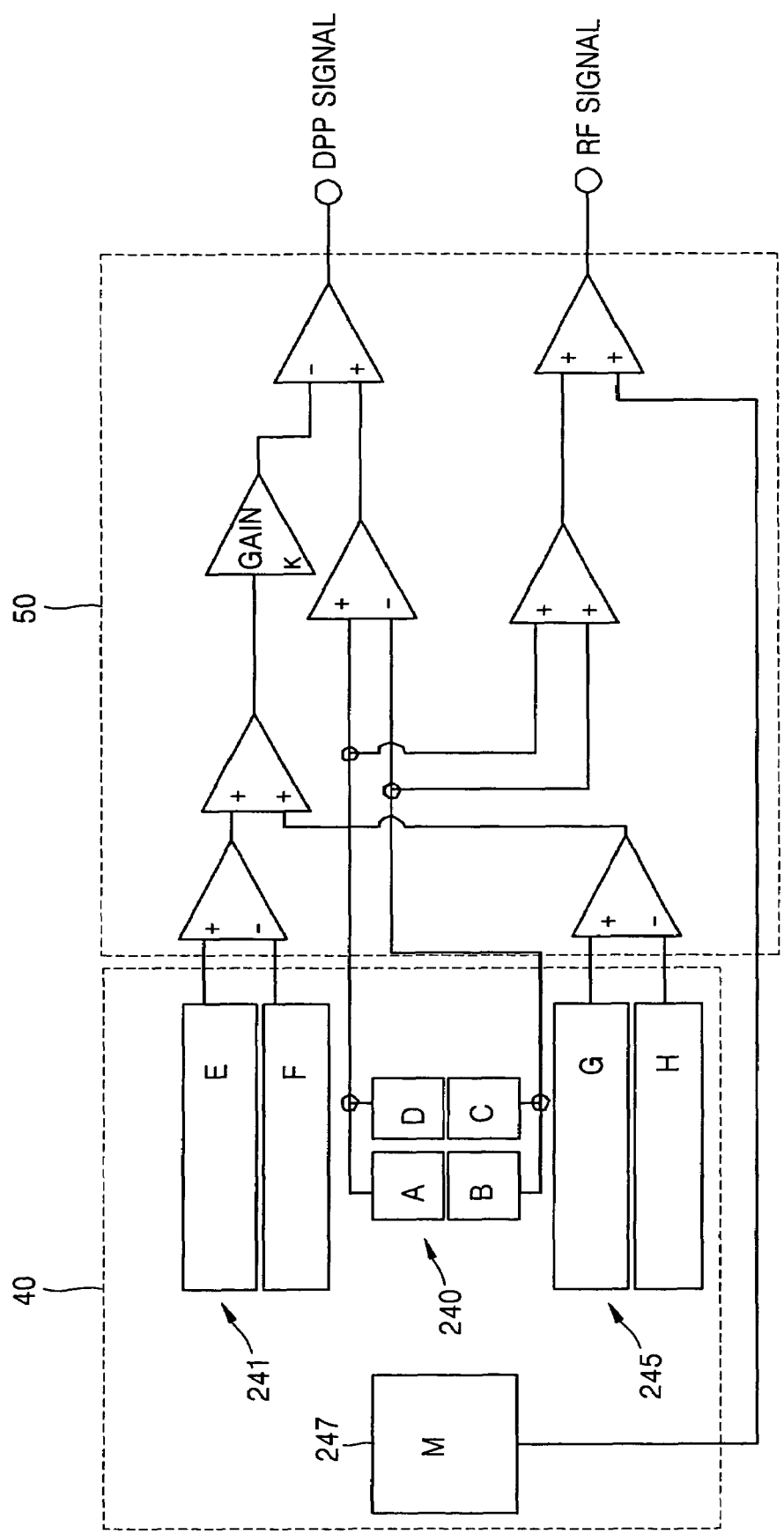
FIG. 9 is a view of the structure of a photodetector of FIG. 6 and a circuit used to detect a tracking error signal (DPP signal) using a DPP method and an information reproduction signal (RF signal)

Alternatively, as shown in FIGS. 6 and 7, when light emitted from the light source 11 is split into at least three beams by the grating 12, the photodetector 40 may include a main photodetector 240 and first and second sub-photodetectors 241 and 245, respectively, on both sides of the main photodetector 240, which receive light diffracted by the grating 12 and reflected from the optical disc 10, as shown in FIG. 9.

FIG. 9 is a view of the structure of one example of a photodetector 40 that may be used in the optical pickup according to the present invention, and a circuit 50 to operate the signal. Referring to FIG. 9, main light received at the main photodetector 240 is 0th-order diffracted light that is transmitted straight through the grating 12, and first and second sub-light received at the first and second sub-photodetectors 241 and 245 is light that is diffracted into positive and negative 1st-order light by the grating 12.

The main photodetector 240 may be, for example, bisected in both a radial direction (direction R) and a tangential direction (direction T) of the optical disc 10 so that detecting a focus error signal and/or tracking error signal is possible. That is, the main photodetector 240 has a structure with at least four sections.

FIG. 9 shows an example of the main photodetector 240 having four sections, bisected in both the direction R and the direction T. In another example, the main photodetector 240 may be divided into 8 sections, by dividing the main photodetector 240 into four sections in the direction R and bisecting the main photodetector 240 in the direction T.

The first and second sub-photodetectors 241 and 245 may be bisected in the direction R so that the tracking error signal may be detected using a differential push-pull (DPP) method. That is, the main photodetector 240 may be at least bisected in the direction R and at least bisected in the direction T, and the first and second sub-photodetectors 241 and 245 may be at least bisected in the direction R, to be able to detect the tracking error signal using the DPP method.

When the main photodetector 240 is divided into four or eight sections and the first and second sub-photodetectors 241 and 245 are bisected in the direction R as described above, detection of a tracking error signal by the DPP method is possible.

Meanwhile, when some light is diffracted by an optical member 25, which will be described later, in order to suppress interference light caused by an adjacent layer, a part of the reproduction light is also diffracted. The diffraction of reproduction light causes a deterioration of a reproduction signal. Therefore, the photodetector 40 may further include an assistant photodetector 247 that detects the diffracted light at a separate region and compensates the reproduction signal.

When light receiving regions of the main photodetector, which is divided into 4 sections, are A, B, C, and D, light receiving regions of the first sub photodetector 241 are E1 and E2, light receiving regions of the second sub photodetector 245 are F1 and F2, and a light receiving region of the assistance photodetector 247 is M, a focus error signal FES, a tracking error signal TES, and an information reproduction signal RF-SUM derived from the divided structure of the photodetector 40 as shown in FIG. 9 and the optical structure of the optical pickup according to the present invention as shown in FIGS. 6 and 7, are as shown in Table 1. For convenience, a light receiving region and a signal detected by the light receiving region are denoted by the same reference character.

TABLE 1

|  | ROM | Recordable |
| --- | --- | --- |
| FES | Astigmatic Method: $(B + D) - (A + C)$ | |
| TES | DPD | Push-Pull: $(B + C) - (A + D)$ |
|  | | DPP: $[(B + C) - (A + D)] - \kappa[(E - F) + (G - H)]$ |
| RF-SUM | $A + B + C + D + M$ or $A + B + C + D$ | |

In Table 1, κ denotes a gain, ROM denotes a read-only optical disc, and recordable denotes a recordable optical disc such as R, RW, and RAM, or a recordable high-density optical disc such as a BD or an AODF. Here, DPP is mainly used for a RAM-type optical disc or a BD, and Push-Pull is mainly used for an R/RW-type optical disc. DPP may be used not only for RAM and BDs but also for an R/RW-type optical disc.

FIG. 9 shows an example of the circuit 50 that detects a tracking error signal TES, i.e., a DPP signal, using the DPP method, and the information reproduction signal RF_SUM. As described previously with reference to FIGS. 3, 4A and 4B, during recording on and/or reproducing from an optical disc with a plurality of recording layers on at least one side thereof, light received by the photodetector includes not only light reflected from a layer intended for recording and/or reproduction (hereinafter referred to as an object layer) dispositioned on the focus of the objective lens, but also interference light reflected from an adjacent layer.

Here, the interference light reflected from the adjacent layer that overlaps with the 0th-order, positive 1st-order, and negative 1st-order light reflected from the object layer is 0th-order light. Therefore, the optical member 25 may include a diffraction region, i.e., a hologram region, which diffracts a part of the light reflected from the adjacent layer during recording on and/or reproducing from the optical disc with the plurality of recording layers on at least one side thereof.

If at least the 0th-order light reflected from the adjacent layer that overlaps with the positive and negative 1st-order light reflected from the intended layer is diffracted by the hologram region of the optical member 25, the interference light from the adjacent layer may be suppressed from entering the first and second sub-photodetectors 241 and 245.

The optical member 25 includes a hologram region with the same or a substantially similar structure of the photodetector 40 of FIG. 9. In order to suppress the interference light from the adjacent layer, the optical member 25 diffracts the interference light using the hologram region.

Figure 10A:
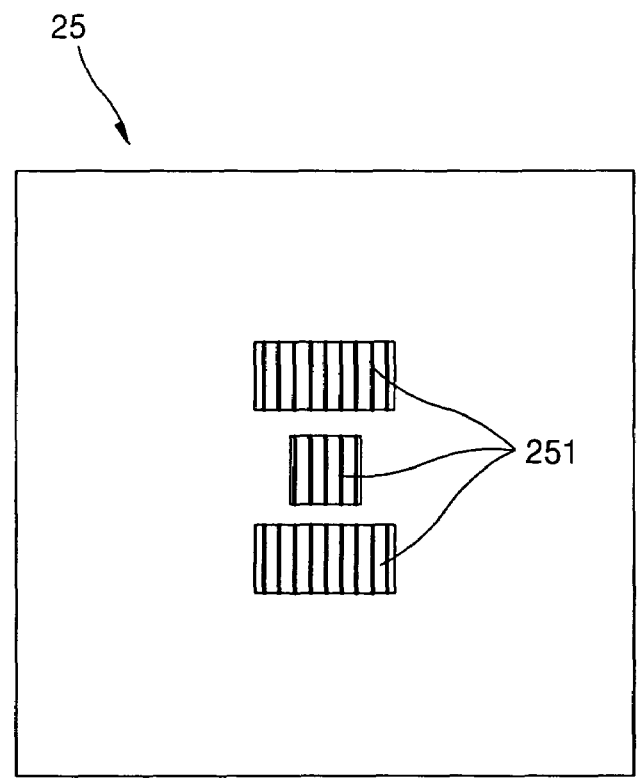
FIGS. 10A through 10C are views of some examples of hologram regions of an optical member of FIG. 6.
Figure 10B:
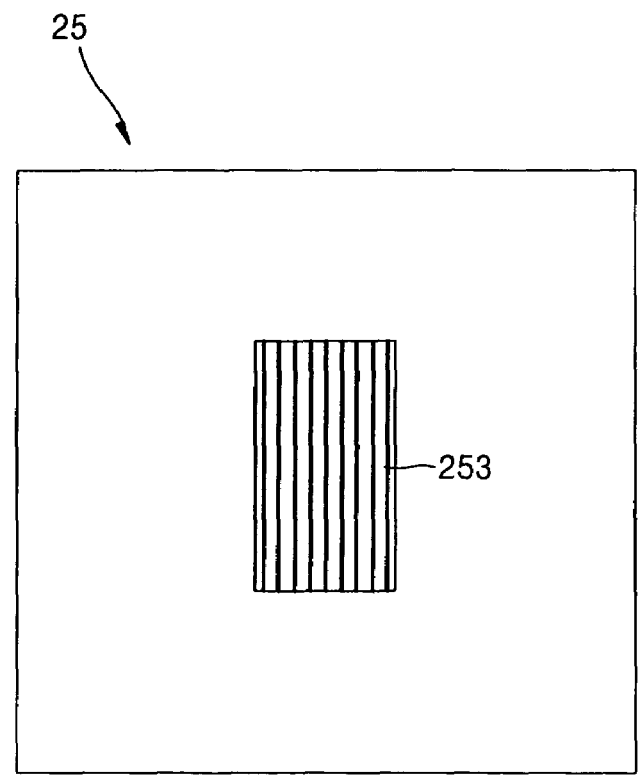
Figure 10C:
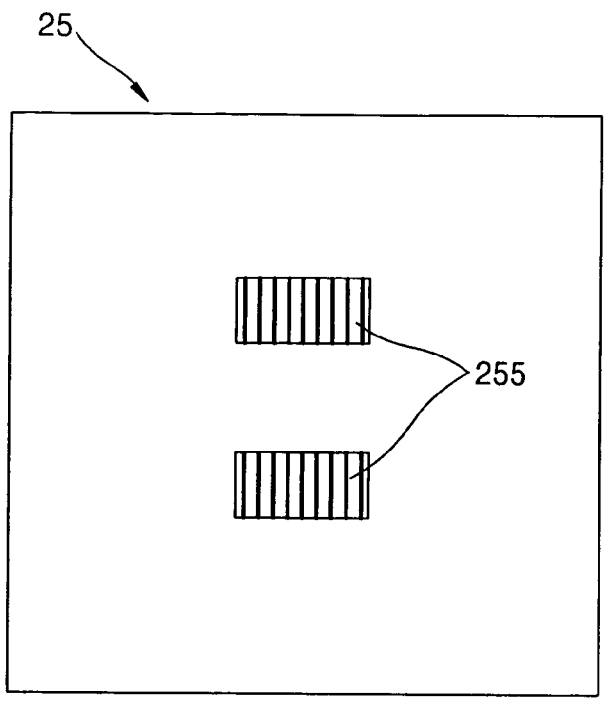

FIGS. 10A through 10C are views of various examples of the hologram regions of the optical member 25. However, of course other configurations are also possible.

FIG. 10A shows an example in which the optical member 25 includes hologram regions 251 corresponding to the shape of the main photodetector 240 and first and second sub-photodetectors 241 and 245 of the photodetector 40, and diffracting the 0th-order light reflected from the adjacent layer. FIG. 10B shows an example of the optical member 25 including a single hologram region 253 so that the 0th-order light from the adjacent layer is not received by the main photodetector 240 and first and second sub-photodetectors 241 and 245 of the photodetector 40. FIG. 10C shows an example in which the optical member 25 includes hologram regions 255 corresponding to the shape of the first and second sub-photodetectors 241 and 245 of the photodetector 40, and diffracting the 0th-order light from the adjacent layer.

In FIGS. 10A and 10B, the main photodetector 240 and first and second sub-photodetectors 241 and 245 of the photodetector 40 do not receive the 0th-order light from the adjacent layer. In FIG. 10C, only the first and second sub-photodetectors 241 and 245 do not receive the 0th-order light from the adjacent layer, but the main photodetector 240 receives the 0th-order light from the adjacent layer.

There is a large difference in the quantity of 0th-order light reflected from the object layer and the adjacent layer. Thus, the 0th-order light reflected from the adjacent layer does not have a major effect on a difference signal, i.e., (B+C)−(A+D) signal, used for detecting the tracking error signal by the DPP method.

Figure 5:
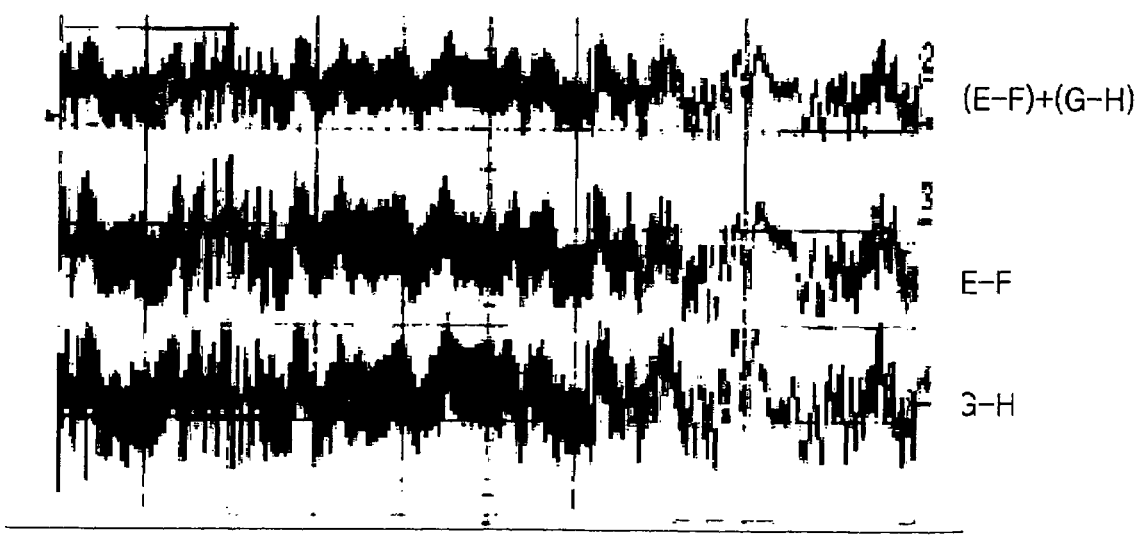
FIG. 5 is a graph illustrating the measurement signals of a difference signal (E−F) of detection signals of light receiving regions E and F, a difference signal (G−H) of detection signals of light receiving regions G and H, and a summing signal of the difference signals [(E−F)+(G−H)] when reproducing from the layer L1.

However, because there is relatively little difference between the quantity of positive and negative 1st-order light reflected from the object layer and the quantity of 0th-order light reflected from the adjacent layer, the 0th-order light reflected from the adjacent layer considerably affects a signal, i.e., (E−F)+(G−H) signal, used to detect the tracking error signal by the DPP method, as previously described with reference to FIG. 5.

Thus, to suppress fluctuation of the tracking signal, the 0th-order light reflected from the adjacent layer and then received at the first and second sub-photodetectors 241 and 245 should not overlap with the positive and negative 1st-order light reflected by the object layer. The optical member 25 with various hologram regions 251, 253 and 255 of FIGS. 10A through 10C satisfies these needs.

Figure 3:
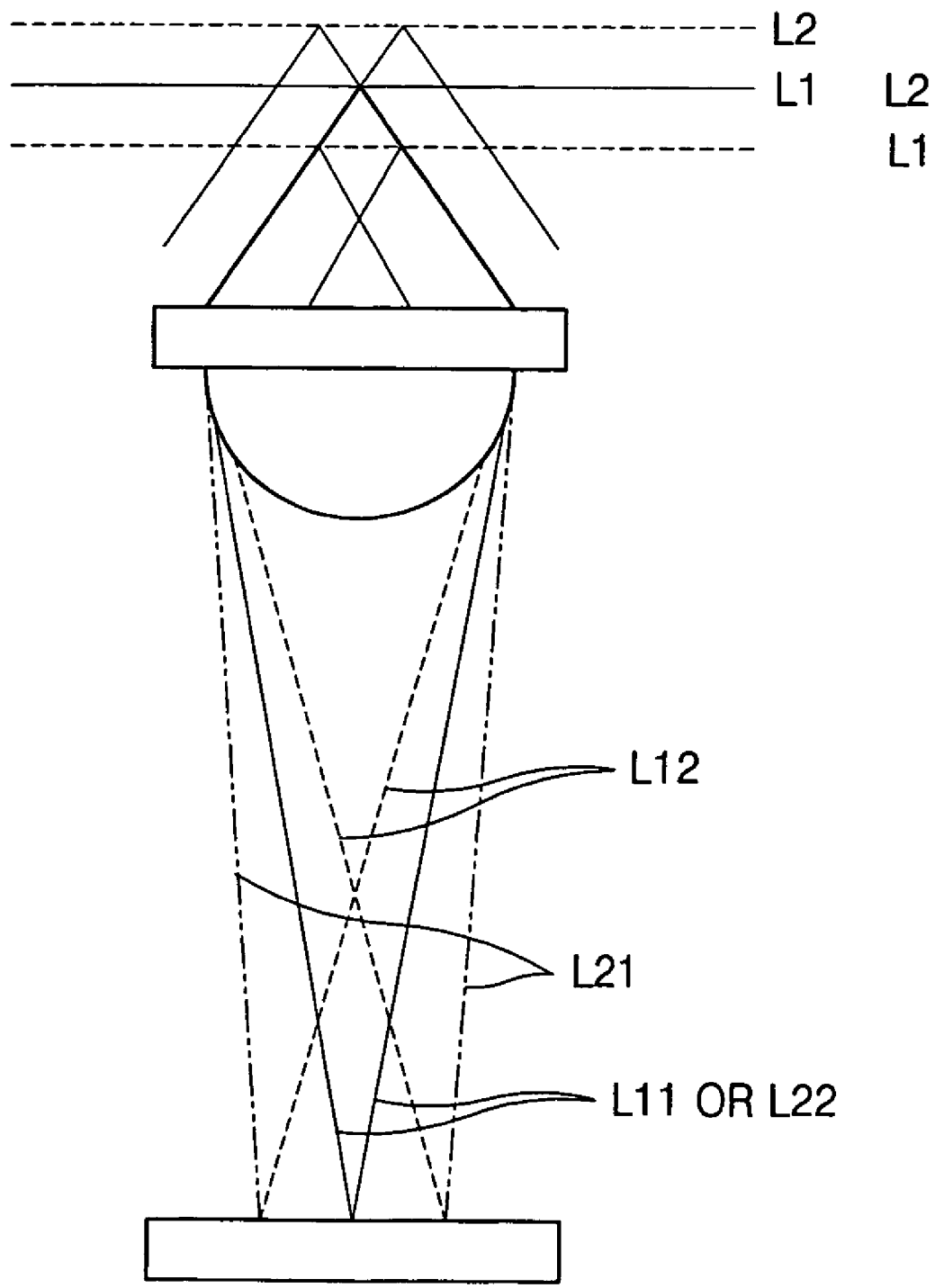
FIG. 3 is a diagram of an optical path during reproduction of a dual-layer optical disc.

That an optical pickup according to the present invention is applied for a dual-layer optical disc, as shown in FIG. 3 is assumed. In addition, as previously described with reference to FIG. 3, that when a photodetector receives light L11 during reproduction from a layer L1 near to a light incident surface, the focus of light L12 reflected from a layer L2 is located in front of the focus of light L11 is also assumed. Conversely, when the photodetector receives light L22 during reproduction from the layer L2, the focus of light L21 reflected from the layer L1 is located behind the focus of the light L22. In this case, a distribution of light reflected from the dual-layer optical disc and collected at the photodetector 40 via the optical member 25 is as shown in FIGS. 11A and 11B.

Figure 11A:
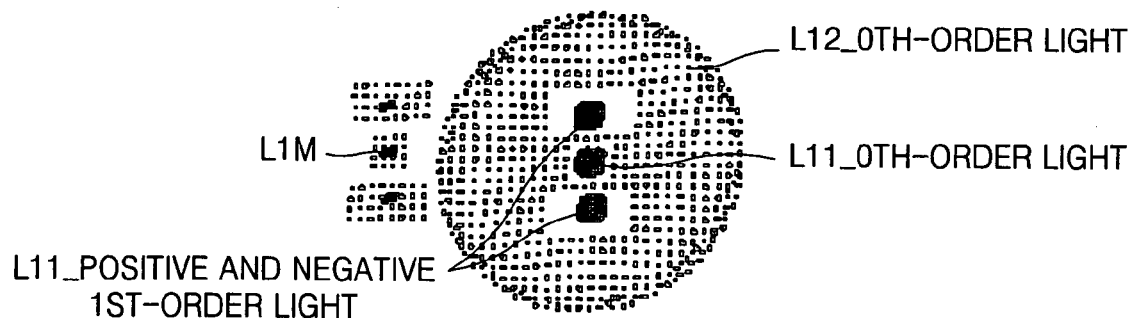
FIG. 11A is a view of a distribution of light collected at the photodetector during reproduction from a layer L1 of an optical disc using the optical pickup of FIG. 6.

FIG. 11A is a view of a distribution of light collected at the photodetector 40 during reproduction from the layer L1. FIG. 11B is a view of a distribution of light collected at the photodetector 40 during reproduction from the layer L2. FIGS. 11A and 11B show when using optical member 25 having the hologram region 251 of FIG. 10A.

Figure 4A:
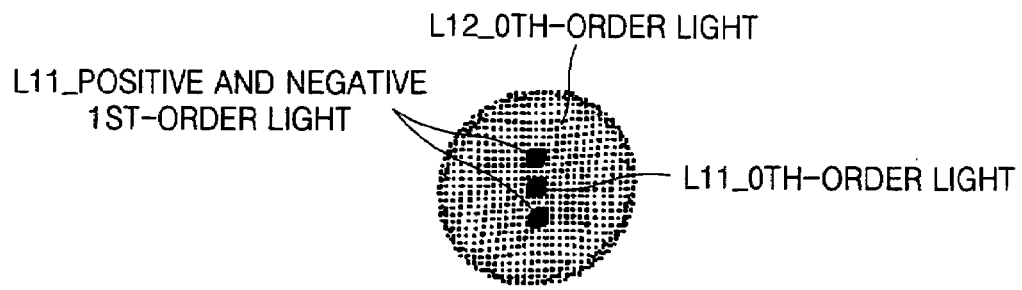
FIG. 4A is a diagram of a distribution of light collected at a photodetector when reproducing from a layer L1.

In FIG. 11A, L11_0th-order light, L11_positive and negative 1st-order light, and L12_0th-order light denote 0th-order light reflected from the layer L1, positive and negative 1st-order light reflected from the layer L1, and 0th-order light reflected from the layer L2, respectively, during the reproduction of the layer L1, as in FIG. 4A. L1M in FIG. 11A denotes light diffracted by the hologram region 251 of the optical member 25.

Figure 4B:
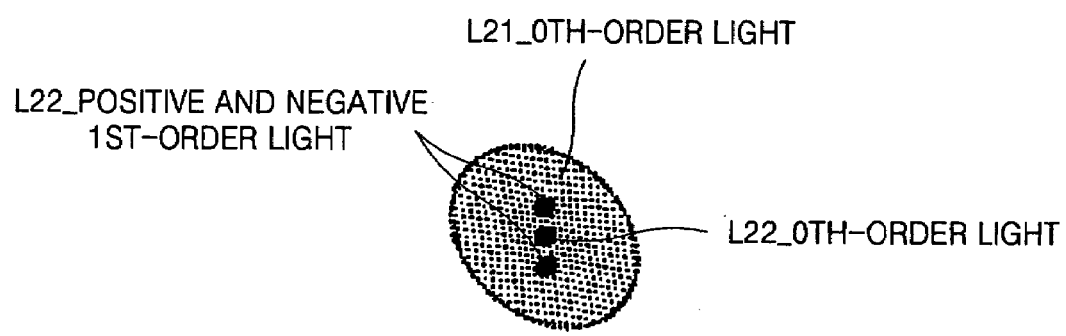
FIG. 4B is a diagram of a distribution of light collected at the photodetector when reproducing from a layer L2.
Figure 11B:
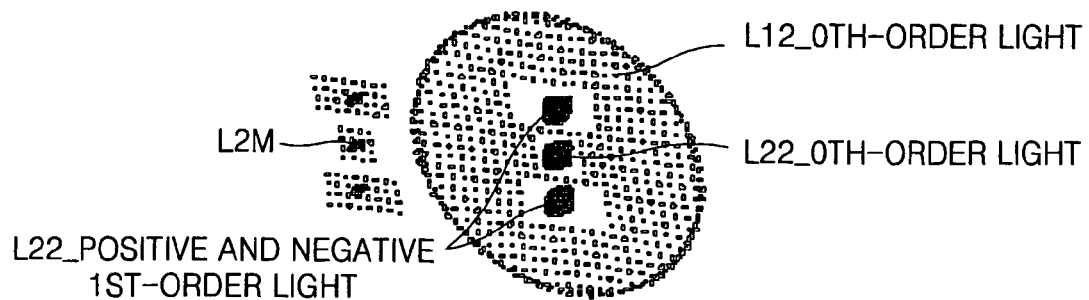
FIG. 11B is a view of a distribution of light collected at the photodetector during reproduction from a layer L2 of the optical disc using the optical pickup of FIG. 6.

In FIG. 11B, L22_0th-order light, L22_positive and negative 1st-order light, and L21_0th-order light denote 0th-order light reflected from the layer L2, positive and negative 1st-order light reflected from the layer L2, and 0th-order light reflected from the layer L1, respectively, during the reproduction of the layer L2, as in FIG. 4B. L2M in FIG. 11B denotes light diffracted by the hologram region 251 of the optical member 25.

As shown in FIGS. 11A and 11B, when the optical pickup according to the present invention is used, the 0th-order light reflected from the adjacent layer should not overlap with the positive and negative 1st-order light reflected from the object layer so that the first and second sub-photodetectors 241 and 245 do not receive the 0th-order light reflected from the adjacent light.

Therefore, since the interference light reflected from the adjacent layer is effectively suppressed at the light receiving regions of the positive and negative 1st-order light for the DPP signal, fluctuation of the tracking error signal caused by the interference light is much improved.

Figure 12:
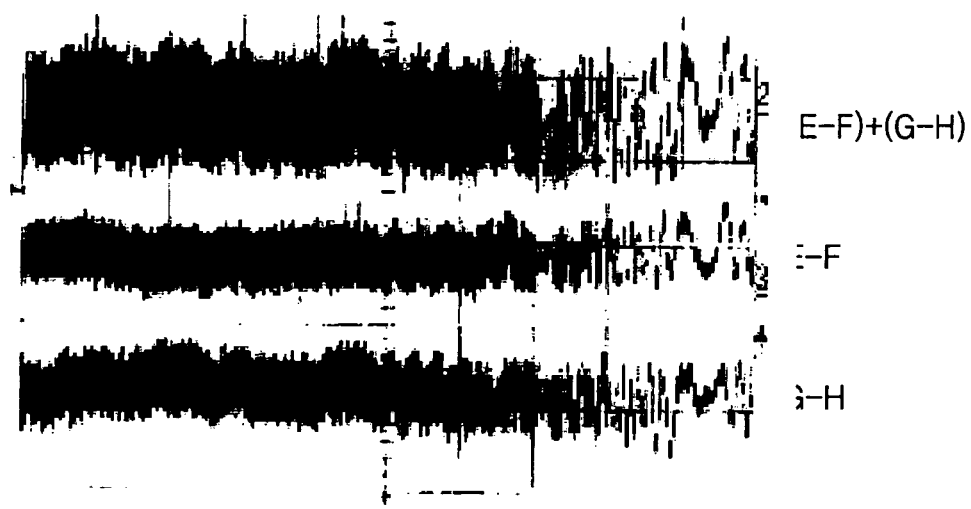
FIG. 12 is a graph illustrating the measurement signals of a difference signal (E−F) of detection signals of light receiving regions E and F, a difference signal (G−H) of detection signals of light receiving regions G and H, and a summing signal of the difference signals [(E−F)+(G−H)] when reproducing from the layer L1 by the optical pickup according to the present invention.

FIG. 12 is a view illustrating the measurement signals of a difference signal (E−F) of detection signals of light receiving regions E and F, a difference signal (G−H) of detection signals of light receiving regions G and H, and a summing signal [(E−F)+(G−H)] of the difference signals when reproducing data from the layer L1 using the optical pickup according to the above described embodiment of the present invention.

As shown in FIG. 12, the difference signal (E−F) and the difference signal (G−H) hardly fluctuate and have opposite phases to each other. Therefore, when the difference signal (E−F) and the difference signal (G−H) are summed, fluctuation thereof is greatly improved. When comparing FIGS. 5 and 12, fluctuation of the signal using the present invention is improved relatively remarkably.

As such, when the optical pickup according to the present invention is used, a tracking error signal detected using the DPP method hardly fluctuate due to, for example, deviation in the thickness of layers, when considering the tracking error signal detected using the DPP method is $TES_{DPP} = [(A+D)-(B+C)] - \kappa[(E-F)+(G-H)]$.

FIGS. 6 and 7 show an example of the optical member 25 disposed between the light source 11 and the quarter wave plate 19, according to a further embodiment of the invention, between the optical path changer and the quarter wave plate 19. As shown in FIGS. 6 and 7, when an optical pickup according to the present invention includes the quarter wave plate 19, and the optical member 25 is disposed between the optical path changer and the quarter wave plate 19 to be diffracted, the optical pickup may include a polarization hologram at hologram regions 251, 253 or 255 of the optical member 25 which selectively diffracts only light reflected from the optical disc 10 according to a polarization thereof so that only light reflected from the optical disc 10 is diffracted.

For example, when light emitted from the light source 11 toward the objective lens 30 is P-polarized light, the polarization hologram straightly transmits the P-polarized light, and diffracts only S-polarized light, which is light reflected from the optical disc 10 and altered into the S-polarized light via the quarter wave plate 19.

The reason to form the polarization hologram on the optical member 25 so as to not diffract light propagating toward the objective lens 30 from the light source 11 is to prevent losing any light focused onto the optical disc 10 by diffraction operation of the optical member 25. Such a loss would weaken the intensity of the light spot formed on the optical disc 10. A weakening of the intensity of the light spot could lower the amount of recording light and/or lead to a deterioration of a reproduction signal.

Meanwhile, to reduce fluctuation of the tracking error signal, in a process of diffracting the 0th-order light reflected from the adjacent layer so that the first and second sub-photodetectors 241 and 245 do not receive the 0th-order light, when an optical member 25 includes hologram regions 251 and 253 of FIGS. 10A and 10B, a portion of the 0th-order light reflected from the object layer is also diffracted with the 0th-order light reflected from the adjacent layer. Therefore, since the main photodetector 240 does not receive the 0th-order light reflected from the adjacent layer, interference light that affects the reproduction signal is blocked so as to reduce crosstalk between layers in the reproduction signal.

Of course, when the optical member 25 includes the hologram regions 251 and 253 of FIGS. 10A and 10B, a portion of the 0th-order light reflected from the object layer is also diffracted with the 0th-order light reflected from the adjacent layer.

Thus, during information reproduction, in order to prevent deterioration of the reproduction signal, the assistant photodetector 247 may detect a diffracted portion of the 0th-order light (for example, L1M and L2M of FIGS. 11A and 11B, respectively), and an information reproduction signal RF_SUM may be detected by adding the detected signal of the assistant photodetector 247 and a detected signal of the main photodetector 240.

When the optical member 25 includes the hologram region 255 of FIG. 10C, the 0th-order light reflected from the object layer is not diffracted. Therefore, the assistant photodetector 247 included to prevent deterioration of the reproduction signal may be removed. In addition, the assistant photodetector 247 may be removed when trying to reduce crosstalk between layers, even if the reproduction signal is slightly deteriorated.

If the photodetector 40 does not have the assistant photodetector 247, then an adder before a RF signal output in the circuit 50 of FIG. 9 is removed.

In the above described embodiment of the present invention, the optical member 25 is disposed between the optical path changer and the quarter wave plate 19, and the case of the polarization hologram being formed on the optical member 25 has been explained and illustrated as an example. However, the present invention is not limited to the described embodiment and examples.

That is, an optical pickup according to the present invention may not include the quarter wave plate 19. In this case, the optical member 25 may be disposed between the optical path changer and the objective lens 30, and the polarization hologram may be formed on the optical member 25. Here, because the semiconductor laser used as the light source 11 generally emits S- or P-polarized light, the polarization hologram diffracts linearly polarized light emitted from the light source 11. In this case, the 0th-order light caused by an adjacent layer reflected from the optical disc 10 is diffracted so that at least the first and second sub-photodetectors 241 and 245 of the photodetector 40 do not receive the 0th-order light from the adjacent layer. Of course, light propagating from the light source 11 to the objective lens 30 is also diffracted by the optical member 25. However, this diffracted light is not used as effective light. Thus, using the optical member 25 with the polarization hologram formed between the optical path changer and the objective lens 30 without including the quarter wave plate 19 is possible if some light loss is acceptable.

In addition, regardless of whether or not the quarter wave plate 19 is included, an optical pickup according to the present invention may include the optical member 25 with a non-polarization hologram formed thereon between the optical path changer and the objective lens 30. In this case, not only light reflected from the optical disc 11 but also light propagating towards the objective lens 30 from the light source 11 is diffracted by the optical member 25 with the non-polarization hologram formed thereon. Therefore, using such a structure is possible if some light loss is acceptable.

On the other hand, the optical member 25 may be disposed between the optical path changer, i.e., the polarization beam splitter 14, and the photodetector 40. In this case, light passes through the optical member 25 only once. Therefore, the hologram regions 251, 253 or 255 formed on the optical member 25 may be either a non-polarization hologram or a polarization hologram.

Since the embodiment in which the optical member 25 is disposed between the polarization beam splitter 14 and the photodetector 40 can be understood well through analogical inference, an illustration will be omitted.

As is described above, the type of holograms formed on the optical member 25 and the location of the optical member 25 may vary. What is important is that the 0th-order light reflected from the adjacent layer of the optical disc 10 is not received by at least the main photodetector 240 and/or the first and second sub-photodetectors 241 and 245 using the optical member 25 so that the interference light reflected from the adjacent layer may be suppressed.

Figure 13:
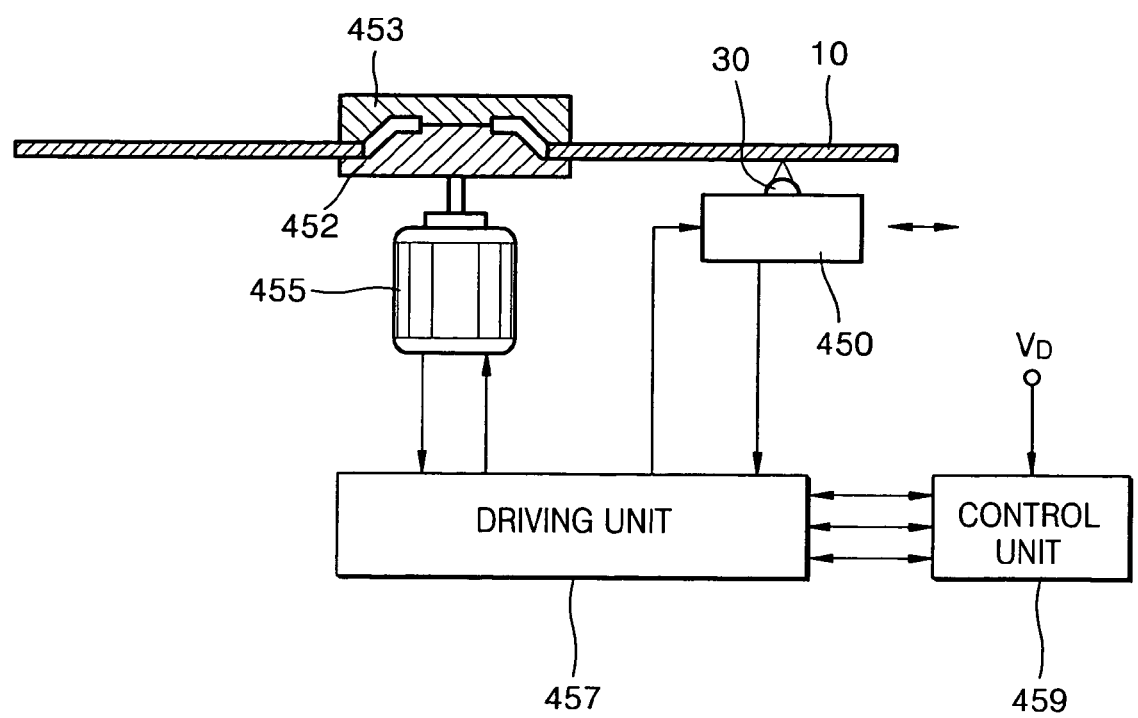
FIG. 13 is a schematic diagram of an optical recording and/or reproducing apparatus using the optical pickup according to the present invention.

FIG. 13 is a schematic diagram of an optical recording and/or reproducing apparatus using the optical pickup according to the embodiment of the present invention. Referring to FIG. 13, the optical recording and/or reproducing apparatus includes a spindle motor 455 that rotates an optical disc, which is an optical information storage medium, an optical pickup 450 installed to be able to move in a radial direction of the optical disc 10 that reproduces information from and/or records information on the optical disc 10, a driving unit 457 that drives the spindle motor 455 and the optical pickup 450, and a control unit 459 that controls, for example, a focus of the optical pickup and/or a tracking servo. Reference numeral 452 denotes a turn table, and 453 denotes a clamp for chucking the optical disc 10.

The optical pickup 450 has an optical structure according to the present invention, as described above.

Light reflected from the optical disc 10 is detected by a photodetector in the optical pickup 450 and is photoelectrically converted into an electrical signal which is input to the control unit 459 through the driving unit 457. The driving unit 457 controls the rotating speed of the spindle motor 455, amplifies the input signal, and drives the optical pickup 450. The control unit 459 sends a focus servo, tracking servo, and/or tilt servo control command to the driving unit 457 again to conduct focusing, tracking, and/or tilt operation of the optical pickup 450 based on the signal input from the driving unit 457.

In an optical recording and/or reproducing apparatus adopting the optical pickup according to the present invention, during recording on and/or reproduction from a multiple layer optical disc with a plurality of recording layers on one side thereof, interference light reflected from an adjacent layer can be suppressed so as to reduce fluctuation of a tracking error signal detected using a DPP method.

The present invention, as is described above, prevents interference light reflected from an adjacent layer from reaching a photodetector, especially first and second sub-photodetectors of the photodetector. Thus, even when the thickness of the distance between layers is altered, fluctuation of the tracking error signal can be reduced, making it possible to detect a tracking error signal of excellent quality. In addition, by preventing the main photodetector from receiving the interference light, crosstalk between layers is reduced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical pickup for use with an optical information storage medium, comprising:
   a light source which emits light of a predetermined wavelength;
   an objective lens which focuses the light emitted from the light source into a spot on the optical information storage medium;
   an optical path changer to direct light from the light source to the objective lens and to change a propagation path of the light;
   a photodetector which receives the light reflected from the optical information storage medium via the optical path changer and detects an information signal and/or an error signal; and
   an optical member which inhibits interference light reflected from an adjacent layer from being received by the photodetector when the optical information storage medium has a plurality of recording layers on at least one side thereof.

2. The optical pickup according to claim 1, wherein the optical member comprises a diffraction region which diffracts a portion of the light reflected from the adjacent layer.

3. The optical pickup according to claim 2, wherein one of a polarization hologram or a non-polarization hologram is formed on the diffraction region.

4. The optical pickup according to claim 3, wherein the optical member is disposed between the optical path changer and one of the objective lens and the photodetector.

5. The optical pickup according to claim 4, further comprising a quarter wave plate which alters the polarization of incident light, between the optical path changer and the objective lens.

6. The optical pickup according to claim 5, further comprising a liquid crystal element which generates a phase difference to compensate for spherical aberration caused by a thickness deviation in the optical information storage medium.

7. The optical pickup according to claim 2, wherein the optical member is disposed between the optical path changer and one of the objective lens or the photodetector.

8. The optical pickup according to claim 1, further comprising a grating which splits the light emitted from the light source into 0th-order light, positive 1st-order light, and negative 1st-order light, and transmits the 0th-order light, positive 1st-order light, and negative 1st-order light toward the optical information storage medium.

9. The optical pickup according to claim 8, wherein the photodetector comprises:
   a main photodetector that receives the 0th-order light reflected from the optical information storage medium; and
   first and second sub-photodetectors which receive the positive 1st-order light and the negative 1st-order light reflected from the optical information storage medium, respectively, wherein the optical member diffracts at least a portion of the 0th-order light reflected from the adjacent layer so that the first and second sub-photodetectors do not receive the 0th-order light.

10. The optical pickup according to claim 9, wherein the main photodetector is at least bisected once in a radial direction and once in a tangential direction of the optical information storage medium, and the first and second sub-photodetectors are at least bisected once in the radial direction of the optical information storage medium, making detection of a tracking error signal using a differential push-pull method possible.

11. The optical pickup according to claim 9, wherein the photodetector further comprises an assistant photodetector that receives the 0th-order light diffracted by the optical member.

12. The optical pickup according to claim 9, wherein the optical member comprises a diffraction region shaped to correspond to a shape of the main photodetector and the first and second sub-photodetectors, so that the main photodetector and the first and second sub-photodetectors do not receive the 0th-order light reflected from the adjacent layer.

13. The optical pickup according to claim 9, wherein the optical member comprises a diffraction region formed as a single region so that the main photodetector and the first and second sub-photodetectors do not receive the 0th-order light reflected from the adjacent layer.

14. The optical pickup according to claim 9, wherein the optical member comprises a diffraction region to prevent the first and second sub-photodetectors from receiving the 0th-order light reflected from the adjacent layer.

15. The optical pickup according to claim 1, further comprising a quarter wave plate which alters the polarization of incident light, between the optical path changer and the objective lens.

16. The optical pickup according to claim 15, further comprising a liquid crystal element which generates a phase difference to compensate for spherical aberration caused by a thickness deviation in the optical information storage medium.

17. The optical pickup according to claim 15, wherein the optical path changer is a polarization-dependent optical path changer.

18. The optical pickup according to claim 1, wherein the light source emits light of a blue wavelength and the objective lens satisfies a blu-ray disc standard, so that information is recordable on and/or reproducable from the optical information storage medium with a plurality of recording layers on at least one side thereof, as regulated in the blu-ray disc standard.

19. An optical pickup of a recording/reproducing medium, the optical pickup comprising:
a light source to emit light;
an objective lens to focus the emitted light onto the recording/reproducing medium having a recording/reproducing layer and an adjacent layer;
a photodetector to detect an information signal and/or error signal by receiving the light that is reflected from the recording/reproducing medium; and
an optical member to diffract a part of the light that is reflected from the adjacent layer during recording on and/or reproduction from the recording/reproducing layer, to prevent interference caused by the light that is reflected from the adjacent layer when the photodetector receives the light that is reflected from the recording/reproducing medium.

20. The optical pickup according to claim 19, further comprising an optical path changer to change the propagation path of incident light according to a polarization thereof, in order to satisfy a high-efficiency requirement of a recording optical system.

21. The optical pickup according to claim 20, wherein the optical path changer comprises a polarization beam splitter.

22. The optical pickup according to claim 21, further comprising a quarter wave plate to alter the polarization of incident light, between the polarization beam splitter and the objective lens.

23. The optical pickup according to claim 19, further comprising a compensation element to generate a phase difference to compensate for spherical aberration caused by deviation in the thickness of the recording/reproducing medium.

24. The optical pickup according to claim 23, wherein the compensation element comprises a liquid crystal.

25. The optical pickup according to claim 24, wherein the liquid crystal has a polarization characteristic and selectively generates a phase difference by a polarization of incident light and the operation of an electric power source.

26. The optical pickup according to claim 25, wherein when the electric power source is on, the liquid crystal compensates for spherical aberration caused by thickness deviation by generating a phase difference in one polarized beam of light, which proceeds from the light source to the optical disc, and by altering a wavefront thereof, and when the power is off, the liquid crystal transmits all incident light as the incident light is, without generating any phase difference regardless of the polarization of the incident light.

27. The optical pickup according to claim 25, wherein the liquid crystal is driven to alter the phase distribution of transmitted light to be opposite to the phase distribution of the spherical aberration such that compensating for the spherical aberration is possible.

28. The optical pickup according to claim 19, further comprising a grating to diffract light emitted from the light source into 0th-order light and positive and negative 1st-order light so that a tracking error signal may be detected.

29. The optical pickup according to claim 28, wherein a reproduction signal is derived from a detection signal of the 0th-order light, and a tracking error signal is derived from an operation of detection signals of the 0th-order light and positive and negative 1st-order light.

30. The optical pickup according to claim 28, wherein when light emitted from the light source is split into at least three beams by the grating, the photodetector comprises:
a main photodetector; and
first and second sub-photodetectors on both sides of the main photodetector, which receive light diffracted by the grating and reflected from the recording/reproducing medium.

31. The optical pickup according to claim 30, wherein main light received at the main photodetector is 0th-order diffracted light that is transmitted straight through the grating, and first and second sub-light received at the first and second sub-photodetectors is light that is diffracted into positive and negative 1st-order light by the grating.

32. The optical pickup according to claim 31, wherein the main photodetector may be bisected in both a radial direction and a tangential direction of the recording/reproducing medium such that detecting a focus error signal and/or tracking error signal is possible or divided into 8 sections, by dividing the main photodetector into four sections in a radial direction and bisecting the main photodetector in the tangential direction of the recording/reproducing medium.

33. The optical pickup according to claim 32, wherein first and second sub-photodetectors may be bisected in the radial direction so that the tracking error signal is detectable using a differential push-pull (DPP) method.

34. The optical pickup according to claim 33, wherein the main photodetector may be at least bisected in the radial direction and at least bisected in the tangential direction, and the first and second sub-photodetectors may be at least bisected in the radial direction, to be able to detect the tracking error signal using the DPP method.

35. The optical pickup according to claim 34, wherein when the main photodetector is divided into four or eight sections and the first and second sub-photodetectors are bisected in the radial direction, detection of a tracking error signal by the DPP method is possible.

36. The optical pickup according to claim 35, wherein some light is diffracted by the optical member to suppress interference light caused by an adjacent layer, a part of the reproduction light also being diffracted so as to cause a deterioration of a reproduction signal, the photodetector comprising an assistant photodetector to detect the diffracted light at a separate region and to compensate the reproduction signal.

37. The optical pickup according to claim 36, wherein the optical member comprises a diffraction region to diffract a part of the light reflected from the adjacent layer during recording on and/or reproducing from recording/reproducing medium.

38. The optical pickup according to claim 37, wherein the diffraction region is a hologram region to suppress interference light from the adjacent layer from entering the first and second sub-photodetectors.

39. The optical pickup according to claim 38, wherein the optical member comprises hologram regions corresponding to the shape of the main photodetector and first and second sub-photodetectors.

40. The optical pickup according to claim 39, further comprising a polarization hologram at the hologram regions.

41. The optical pickup according to claim 40, wherein a portion of the 0th-order light reflected from the recording/reproducing layer is also diffracted with the 0th-order light reflected from the adjacent layer, such that interference light that affects the reproduction signal is blocked so as to reduce crosstalk between layers in the reproduction signal.

42. The optical pickup according to claim 38, wherein the optical member comprises a single hologram region so that the 0th-order light from the adjacent layer is not received by the main photodetector and first and second sub-photodetectors.

43. The optical pickup according to claim 38, wherein the optical member comprises hologram regions corresponding to the shape of the first and second sub-photodetectors.

44. The optical pickup according to claim 43, wherein the 0th-order light reflected from the adjacent layer should not overlap with the positive and negative 1st-order light reflected from the recording/reproducing layer so that the first and second sub-photodetectors do not receive the 0th-order light reflected from the adjacent light.

45. The optical pickup according to claim 43, further comprising a polarization hologram at the hologram regions.

46. The optical pickup according to claim 19, wherein the light source emits light with approximately a 405 nm wavelength and the objective lens has a numerical aperture of approximately 0.85.

47. The optical pickup according to claim 46, wherein when the optical pickup records onto and/or reproduces from a high-density optical disc satisfying a blu-ray disc (BD) standard.

48. The optical pickup according to claim 19, wherein the light source emits light with approximately a 650 nm wavelength and the objective lens 30 has a numerical aperture of approximately 0.65.

49. The optical pickup according to claim 48, wherein the optical pickup records onto and/or reproduces from a digital versatile disc (DVD) with a plurality of recording layers on one side of the DVD.

50. The optical pickup according to claim 19, wherein the light source comprises an optical module that emits, separately, light of a plurality of wavelengths so that blu-ray discs (BDs), advanced audio discs (AODs) and digital versatile discs (DVDs) are compatibly adopted and the objective lens has a suitable effective numerical aperture for both BDs and DVDs, or further include a separate member to adjust an effective numerical aperture.

51. An optical pickup of a recording/reproducing medium, the optical pickup comprising:

a light source to emit light;

an objective lens to focus the emitted light onto the recording/reproducing medium having a recording/reproducing layer and an adjacent layer;

a main photodetector and first and second sub-photodetectors to detect an information signal and/or error signal by receiving the light that is reflected from the recording/reproducing medium; and an optical member, having a diffraction region shaped to correspond to shapes of the main photodetector and the first and second sub-photodetectors, to diffract a part of the light that is reflected from the adjacent layer during recording on and/or reproduction from the recording/reproducing layer, to prevent interference caused by 0th-order light that is reflected from the adjacent layer.

* * * * *